United States Patent [19]

Munsch

[11] 4,036,368
[45] July 19, 1977

[54] FISHING ROD APPLIANCE

[76] Inventor: Daniel Munsch, 17 Abrew St., Bayshore, N.Y. 11706

[21] Appl. No.: 584,129

[22] Filed: June 5, 1975

[51] Int. Cl.² .......................................... A01K 97/10
[52] U.S. Cl. ............................... 211/60 R; 248/539; 248/226.4
[58] Field of Search ............... 248/37.3, 37.6, 38, 248/40, 41, 43, 226 A, 227, 362, 578; 211/60 R, 60 SK, 60 T, 65, 68; 280/175

[56] References Cited

U.S. PATENT DOCUMENTS

| 46,692 | 3/1865 | Morse et al. | 248/226 A X |
|---|---|---|---|
| 267,694 | 11/1882 | Kersten | 211/60 R |
| 917,350 | 4/1909 | O'Reilly | 248/37.3 |
| 977,835 | 12/1910 | Piscator et al. | 248/41 |
| 1,192,112 | 7/1916 | Porter | 248/226 A X |
| 1,363,231 | 12/1920 | Danly | 248/226 A |
| 2,441,697 | 5/1948 | Gage | 248/110 |
| 2,501,942 | 3/1950 | Hueter | 248/362 |
| 2,712,709 | 7/1955 | Pulrang | 248/362 |
| 2,908,099 | 10/1959 | Burke | 248/38 UX |
| 3,421,632 | 1/1969 | Wood | 211/60 R |

FOREIGN PATENT DOCUMENTS

| 600,531 | 2/1926 | France | 248/226 A |
|---|---|---|---|
| 35,382 | 7/1922 | Norway | 248/110 |

Primary Examiner—William H. Schultz

[57] ABSTRACT

A portable appliance for the holding of a fishing rod to railings, floor surfaces and the like while awaiting a bite.

6 Claims, 5 Drawing Figures

FISHING ROD APPLIANCE

BACKGROUND OF THE INVENTION

This invention relates generally to a fishing rod appliance, and more particularly to a support for a rod designed to be used on land or on a boat whenever there is a firm substance to which the support means can be attached. The invention is particularly useful in that it obviates the necessity of the fisherman paying constant attention to the rod and having to hold the same. It also enables the fisherman the opportunity to have several lines going at the same time. The present invention can be installed on a boat, a dock or bridge thereby affording versatility, utility and safety.

Many types of devices have been employed for mounting a fishing rod, these devices, however, have been subject to criticism as being ineffectual or not satisfactorily performing the task for which they were designed.

SUMMARY OF THE INVENTION

It is accordingly an object of the instant invention to avoid one or more drawbacks of the prior art.

It is another object to provide for a practical, simple, relatively inexpensive holder which is easily fabricated from relatively inexpensive materials.

It is still another object of the invention to provide for a device which is of sturdy construction yet is operative to firmly hold the rod.

These and other objects of the invention will become more apparent from the following detailed description and claims and drawings in which:

Figure 1:
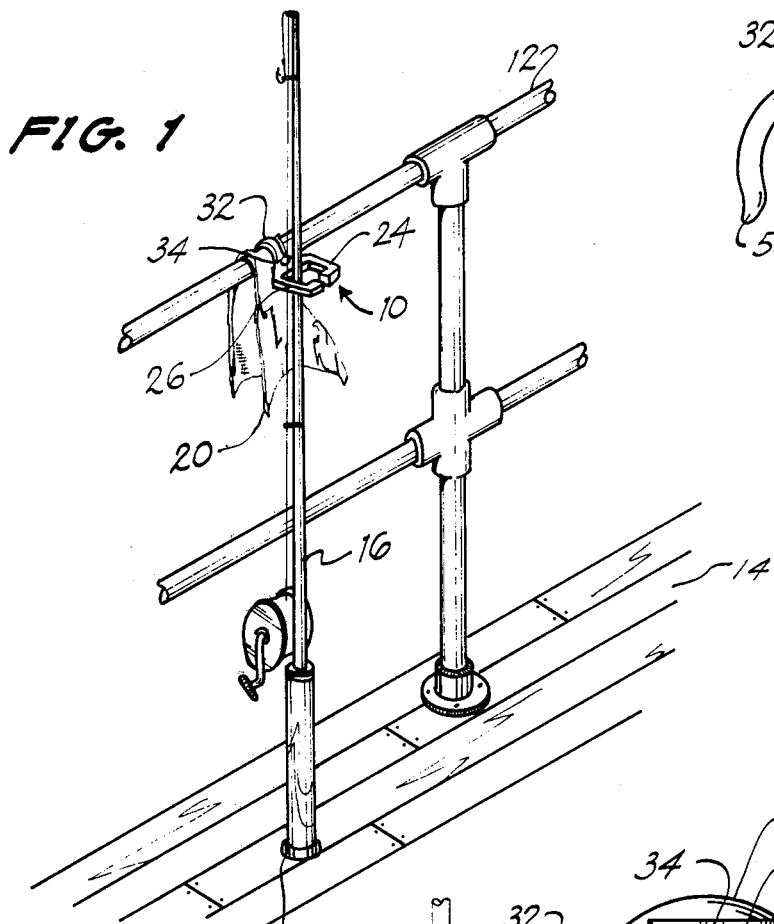
FIG. 1 is a front elevational view showing the device holding a fishing rod to a railing.

Broadly speaking, the invention includes the provision of a fishing rod holder comprising a first section of substantially arcuate shape and a second section of substantially planar shape in substantially non-axial alignment with the first section, the second section being generally U-shaped, the first section having means to mount the holder. In the preferred embodiment, the first section is of two portions and includes a second portion also arcuate in shape which is bent in a direction opposite that of the first portion. The second section of the holder has its distal ends bent inward towards each other and includes an internally threaded recess, fastening means containing a wood thread at one end and a metal thread at the opposite end, the metal thread engaging the recess in male-female engagement.

Referring now particularly to the drawings, there is shown the device 10 of the invention attached to a railing 12 on a dock 14 or the like. The device 10 is shown holding a fishing rod 16 in a substantially upright position. The angle of the rod 16 can be varied by merely setting the lower end 18 portion of the rod 16 further outward from the edge of the dock 14; in other words, pulling the same inward away from the edge of the dock 14. The device 10 is therefore operative to variably position the fishing rod 16. At 20 there is shown a piece of cloth 20 or the like in order to prevent any scratching to the railing 12, or a secure handy wipe where same is of any concern.

Figure 4:
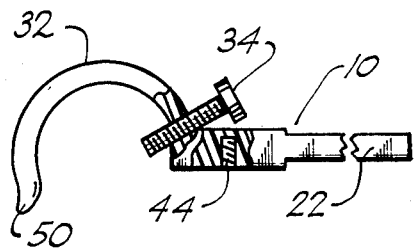
FIG. 4 is a side elevational view of the device partly in section.
Figure 2:
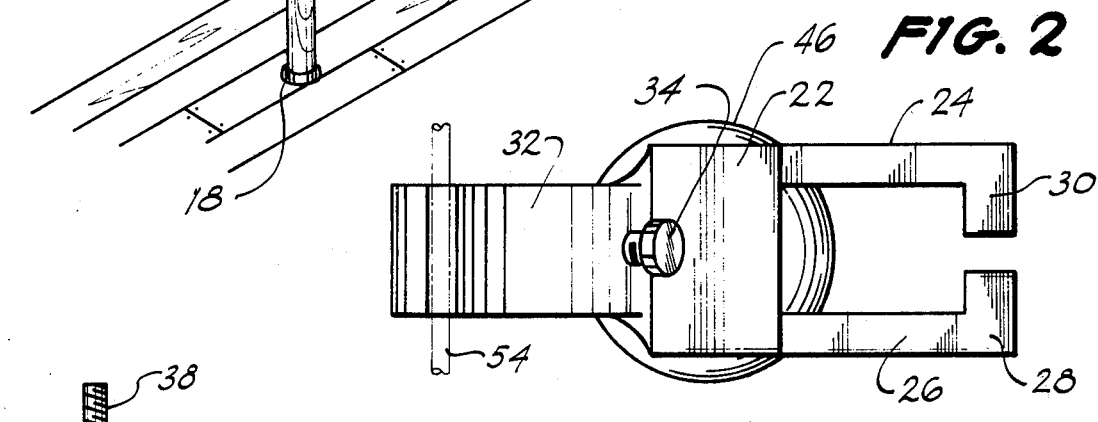
FIG. 2 is a top plan view of a modification of the device.

The device as shown in FIG. 4 is constructed out of any sturdy, rigid, durable material such as metal, wood or any of the hard, high density plastics. The device 10 is generally comprised of two distinct functional sections, which may either be unitary or be affixed one to the other. Said second section 22 forms the rod 16 securing means and is generally substantially U-shaped such that it defines two side portions 24, 26, having a space therebetween operative to hold the rod 16. If desired, the open ends of the U sides 24, 26 may be bent inwardly to define closure means 28, 30 to prevent the rod 16 from falling back out of the confines of the first section though the ends of the U-shape may be brought close together as well. The device 10 will also have said first functional section 32 which is shaped substantially arcuate or hooked shaped in such manner that it is operative to hook onto the rail 12. In its simplest embodiment there are provided means 34 such as screw means in the second section 32 to fasten the device 10 to the rail 12.

Figure 5:
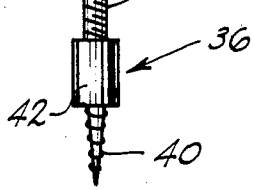
FIG. 5 is a front elevational view of a part of a modification of the device.

In a further embodiment of the invention as shown in FIG. 5 there is provided means 36 having a metal thread at one end 38 and a wood screw thread at the opposite end 40; therebetween there is optionally provided shock impact means 42 such as rubber. Means 36 are operative to be inserted by means 38 into a recess 44. The same will form a male-female engagement. Means 40 are then operative to be screw fastened, into the surface of a railing where hooking means 32 are not operative to hold the device 10. The same may occur on a flat or square shaped dock railing where the hook means 32 cannot securely engage the device 10.

Figure 3:
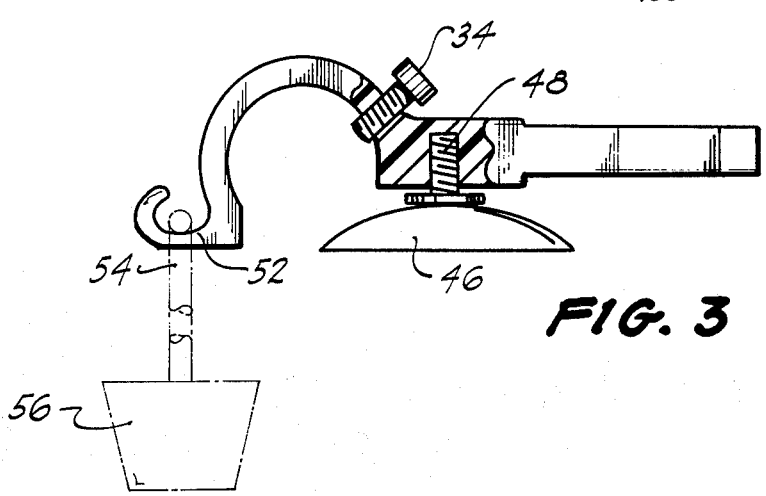
FIG. 3 is a side elevational view partly in section of a modification of the device shown in FIG. 2.

In another embodiment of the invention suction means 46 having a metal thread 48 inserted in the and protruding from the convex portion thereof may be engaged by recess 44 in a male-female relationship as shown in FIG. 3. This embodiment is especially useful in those instances where the hooking portion 32 is not operative, such as adaptation to smooth surfaces, i.e., fiberglass, lacquered surfaces and the like. May even in certain instances be used along with the hooking portion 32 in securing the device 10 to a square shaped railing of suitable dimensions.

In yet a further embodiment of the invention, the hook portion 32 may be constructed such that the leading end 50 of the arcuate shape is curled backward toward the arcuate shape thereby forming a further hook or curled end 52 to accommodate the handle 54 of a bait pail 56 or the like.

Although the present invention has been described in some detail by way of illustration for the purposes of clarity of understanding, it is to be understood that certain changes and modifications may be made within the spirit of the invention without departure from the same.

Having thus described the invention what I claim is:

1. A fishing rod holder comprising a first section having two arcuate shaped portions bent in opposite directions and a second section of substantially planar shape in substantial non-axial alignment with said first section, said second section being generally U-shaped and having its distal ends bent inward towards each other, said first section having means to mount said holder, said second section including an internally threaded recess, fastening means containing a wood thread at one end and a metal thread at an opposite end, said metal thread engaging said recess in male-female engagement.

2. A holder as defined in claim 1 further comprising suction means having screw means thereon operative to engage said recess.

3. A holder as defined in claim 1 constructed of a substantially rigid material.

4. A holder as defined in claim 1 wherein said first section arcs upwardly out of planar alignment with said second section, forms a half ring and reverses direction forming a second half ring.

5. The holder as defined in claim 1 wherein said first section is aligned transverse the area defined by said U shape.

6. The holder as defined in claim 1 wherein both of said means are each independently operative to vary the position of said holder.

* * * * *